United States Patent

Hosokawa

[15] 3,660,785

[45] May 2, 1972

[54] TRANSVERSAL EQUALIZER

[72] Inventor: Jun-Ichi Hosokawa, Higashikatsushika-gun, Japan

[73] Assignee: Kabushikikaisha Asahi Shimbunsha, Osaka-fu, Japan

[22] Filed: July 22, 1970

[21] Appl. No.: 57,164

[30] Foreign Application Priority Data

July 25, 1969 Japan....................................44/58842

[52] U.S. Cl.....................................333/28, 333/18, 333/70 T

[51] Int. Cl.............................................H03h 7/28, H03h 7/14

[58] Field of Search......................................333/28, 70 T, 18

[56] References Cited

UNITED STATES PATENTS

| | | | |
|---|---|---|---|
| 3,348,171 | 10/1967 | Kawashima et al. | 333/28 |
| 3,268,836 | 8/1966 | Linke | 333/28 X |
| 3,050,700 | 8/1962 | Powers | 333/28 X |
| 2,759,044 | 8/1956 | Oliver | 333/70 T X |
| 2,895,111 | 7/1959 | Rothe | 333/28 |
| 2,935,703 | 5/1960 | Linke | 333/20 |

*Primary Examiner*—Herman Karl Saalbach

*Assistant Examiner*—Saxfield Chatmon, Jr.

*Attorney*—Hill, Sherman, Meroni, Gross & Simpson

[57] ABSTRACT

A transversal equalizer for equalizing a transmitted waveform with the use of an echo waveform for correction which is formed through a zero circuit or an energy suppressing circuit of a particular AC frequency.

5 Claims, 9 Drawing Figures

INVENTOR.
Junichi Hosokawa

BY Hill, Sherman, Meroni, Gross & Simpson ATTORNEYS

INVENTOR.
Junichi Hosokawa
BY Hill, Sherman, Meroni, Gross & Simpson ATTORNEYS

TRANSVERSAL EQUALIZER

BACKGROUND OF THE INVENTION

1. Field of the Invention

This invention relates to a transversal equalizer using, for example signal echos, and more particularly to a transversal equalizer for equalizing the transmission characteristics of a band-pass type transmission line through the use of a zero circuit or an energy suppressing circuit of a particular AC frequency.

2. Description of the Prior Art

In the band-pass type transmission line the frequency characteristic of the signal amplitude or group delay time is not flat in almost all cases and waveform distortion resulting therefrom presents a problem in waveform transmission. Generally, the band-pass type transmission system requires a rapid change in the signal amplitude at its cutoff frequency and this often results in appreciable deterioration of the group delay characteristic in the vicinity of the cutoff frequency and introduces difficulties in practice.

For example, a long-distance data transmission and facsimile transmission usually employ a multiplex telephone line but no special measure is taken in such a line for the waveform transmission, so that the waveform distortion is cause by such characteristic deterioration as above mentioned to result in deterioration of the quality of signals received or a decrease in the transmission speed.

To avoid this, an amplitude equalizer has heretofore been used with a group delay equalizer but no satisfactory equalization could have been achieved by such a method. Further, when transmission networks are established with many unspecified telephone lines as is often the case with newspaper offices, it is almost impossible in practice to use equalizers each designed to comply with the transmission characteristic of each telephone line. Therefore, a strong demand has been made for an equalizer easy of adjustment and wide in the characteristic adjustment range.

In compliance with such a demand, there has already been published the principle of an equalizer of a wide variable range of the transmission characteristic, for example, the so-called time or echo equalizer which employs a delay circuit to add a signal with echos for equalization of the transmission characteristic distortion in the time domain. However, such a time equalizer has not been put in practical use because of complexity in adjustment operation. An equalizer using differentiated signal echos, which was simplified in the adjustment operation, was proposed in the U.S. Pat. No. 3,348,171 patented Oct. 17, 1967 but this equalizer cannot be put to practical use because of a difficulty in the equalization adjustment in the band-pass type transmission line, especially in a narrow-band transmission line as is the case with the aforementioned one, though effective for a transmission line for transmitting the DC component.

SUMMARY OF THE INVENTION

This invention is to eliminate the above-mentioned defects experienced in the prior art. The present invention employs a zero circuit or an energy suppressing circuit of a particular AC frequency and an envelope waveform of an amplitude-modulated wave as a waveform for testing equalization, by means of which the energy of the test waveform can be centered upon a particular frequency band to ensure easy and accurate equalization adjustment, thereby to facilitate equalization in the narrow-band transmission line.

Further, in a toll telephone line of a single side band multichannel transmission system the frequency of a received signal at the receiving end usually deviates slightly from that of the transmitted signal. Such frequency deviation is defined to be less than 2 Hz in the CCITT standard. With the conventional time equalizers, the test waveform is applied to the telephone line at the base band without amplitude modulation in such a case, so that the harmonic relation between the fundamental frequency component and the higher harmonic component in the test waveform is impaired to produce waveform distortion, thus making it difficult to achieve equalization based upon the observation of the incoming signal. With the present invention, however, the frequency deviation during transmission can be regarded as a mere deviation of a carrier frequency of the test waveform and does not exert any influence on its envelope.

Accordingly, one object of this invention is to provide a transversal equalizer which enables equalization of the transmission characteristic of a narrow band-pass type transmission line with simple adjustment operation.

Another object of this invention is to provide a transversal equalizer which enables accurate equalization only with a simple adjustment operation such that the waveform of an incoming signal is corrected by the addition of its envelope with an echo of a suitable delay time at the receiving end.

A further object of this invention is to provide a transversal equalizer which can be used for equalization of a toll telephone line of the single side band multi-channel carrier system.

Still a further object of this invention is to provide a transversal equalizer which is simple in construction and hence easy to produce.

Other objects, features and advantages of this invention will become apparent from the following description taken in conjunction with the accompanying drawings.

DESCRIPTION OF THE PREFERRED EMBODIMENTS

Figure 1:
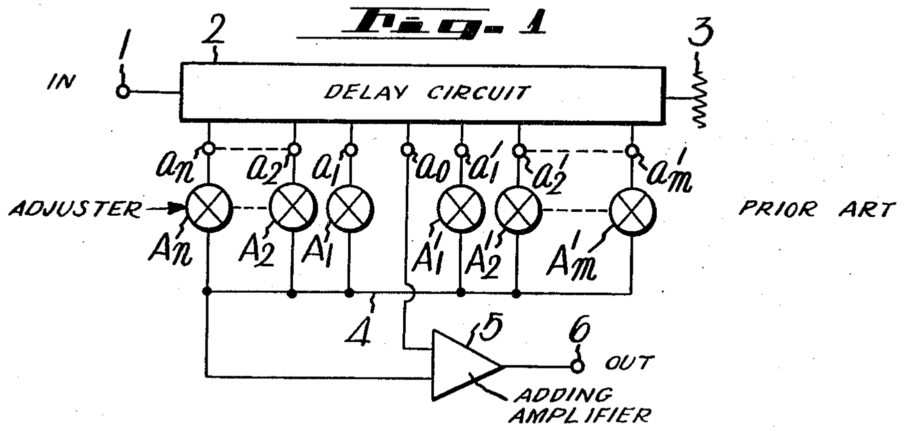
FIG. 1 is a block diagram of a conventional echo equalizer.

To facilitate a better understanding of the transversal equalizer of this invention, a fundamental echo equalizer will be described first in connection with FIG. 1. In the figure a signal to be equalized in impressed to an input terminal 1 of a delay circuit 2, the other end of which is connected to a resistive terminator 3. The delay circuit 2 has taps $a_1$ to $a_n$ and $a_1'$ to $a_m'$ on both sides of a center tap $a_0$ and these taps are located to have equal delay time $\tau$. The center tap $a_0$ is connected to an output terminal 6 through one input terminal of an adding amplifier 5, while the other taps are connected to a common line 4 through their corresponding adjusters $A_1$ to $A_n$ and $A_1'$ to $A_n'$ and the common line 4 is connected to the output terminal 6 through the other input terminal of the adding amplifier 5.

A main signal is derived from the center tap $a_0$ and signals which are sequentially advanced from the main signal by a time $\tau$ are derived from the taps $a_1$ to $a_n$ through their corresponding adjusters $A_1$ to $A_n$. These signals are derived from the taps $a_1$ to $a_n$ with their amplitude ratios to the main signal being made $k_1$ to $k_n$ by the adjusters and their polarities may be altered. Namely, the signal ratios of these signals to the main signal are respectively $k_1e^{j\omega\tau}$, $k_2e^{j\omega2\tau}$, . . . $k_ne^{j\omega n\tau}$ and these signals are picked up on the common line 4 as correction signals. In a similar manner, correction signals which are respectively delayed behind the main signal by the time $\tau$ are derived from the taps $a_1'$ to $a_m'$ through their respectively corresponding adjusters $A_1'$ to $A_m'$. If the amplitude ratios of such signals to the main signal are respectively taken as $k_1'$ to $k_m'$, their signal ratios to the main signal are $k_1'e^{-j\omega\tau}$, $k_2'e^{-j\omega2\tau}$, . . .

$k_m' e^{-j\omega m\tau}$, and these signals are likewise supplied to the common line 4. The correction signals thus derived from the taps are mixed with the main signal by the adding amplifier 5, by which the main signal is equalized and the equalized signal is derived at the output terminal 6.

The transmission characteristic $R_0(\omega)$ of such an echo equalizer can be expressed by the following equation. In this case, the delay time between the input terminal 1 and the center tap $a_0$ is neglected, since it has no relation to the waveform equalization.

$$R_0(\omega) = 1 + \sum_{n=1}^{n} k_n e^{j\omega n\tau} + \sum_{m=1}^{m} k_m' e^{-j\omega n\tau}$$

If $n=m=N$ for simplifying the equation, the above equation can be expressed as follows.

$$R_0(\omega) = 1 + \sum_{n=1}^{n} (k_n + k_n') \cos \omega n\tau + j\sum_{n=1}^{N} (k_n - k_n') \sin \omega n\tau \quad (1)$$

The amplitude characteristic $R_0(\omega)$ is given by the following equation.

$$|R_0(\omega)| = \sqrt{\left\{1 + \sum_{n=1}^{N} (k_n + k_n') \cos \omega n\tau\right\}^2 + \left\{\sum_{n=1}^{N} (k_n - k_n') \sin \omega n\tau\right\}^2} \quad (2)$$

The group delay characteristic $\frac{d\theta}{d\omega}$ is given by the following equation.

$$\frac{d\theta}{d\omega} = \tau \cdot \frac{\sum_{n=1}^{N} n(k_n - k_n') \cos n\omega\tau + \sum_{n=1}^{N} n(k_n + k_n')(k_n' - k_n)}{\left\{1 + \sum_{n=1}^{N} (k_n + k_n') \cos \omega n\tau\right\}^2 + \left\{\sum_{n=1}^{N} (k_n - k_n') \sin \omega n\tau\right\}^2} \quad (3)$$

It will appear from these equations (1), (2) and (3) that the characteristics of the conventional echo equalizer vary in a harmonic manner.

Figure 2:
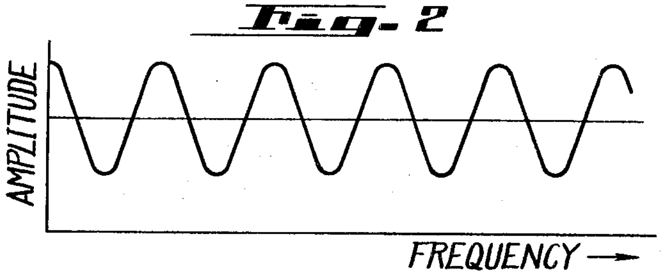
FIG. 2 is a graph showing one example of the amplitude characteristic of the equalizer depicted in FIG. 1.

In FIG. 2 there is shown one example of the amplitude characteristic of the echo equalizer in the case where the echo signal for correction is derived from only one of the adjusters and the outputs from the other adjusters are all zero. The ordinate represents amplitude and abscissa frequency. The undulating variation of the amplitude characteristic is uniform over the entire band and its repetitive cycle is the reciprocal of the time difference between the center tap $a_0$ for the main signal and the delay line tap connected to the adjuster actuated, as will be seen from the equation (2). Accordingly, in the adjustment of the adjusters $A_1$ to $A_n$ and $A_1'$ to $A_m'$ for employing the fundamental echo equalizer in practical equalization the variation of the amplitude characteristic such as shown in FIG. 2 becomes more complicated, so that although perfect equalization is possible theoretically, accurate equalization is very difficult in practice even by the use of an amplitude or delay characteristic direct viewer.

Various methods have been proposed for facilitating the equalization operation of the fundamental echo equalizer. One of them is to adjust the amplitude and delay characteristics in independently adjusting the adjusters in a symmetrical time relationships to the main signal tap in a mechanically ganged relation to one another.

One method that has been proposed for equalization in the time domain is to use a standard waveform signal as of square sinusoidal waveform and add the signal with suitable echos while observing the signal waveform having passed through the transmission line for equalization. Of such various conventional methods, the aforementioned equalizer using differentiated signal echos is an excellent equalizer of good orthogonality which mix the correction signals with the main signal through a differentiation circuit. However, such an equalizer cannot be used except for a low-pass type transmission line, and accordingly, there has not been realized any time equalizer suitable for use with the band-pass type transmission line usually employed. This is because of the fact that the adjustment of the conventional time equalizer using the standard waveform signal is based only upon the harmonic relation over a band ranging from DC to a certain frequency which necessitates transmission of the DC component. Accordingly, the conventional time equalizer cannot be used with the band-pass type transmission line because of the following defect. That is, equalization of the transmission characteristic of, for example, a microwave relay system usually takes place in an intermediate amplifier of about 70 $MH_z$ and the use of the conventional equalizer for the low-pass transmission line results in equalization of the characteristic over the entire band and only a very narrow range of the band is used for the equalization, so that the energy of the standard waveform signal within the band in the adjustment is very small. This naturally results in a difficulty in highly accurate equalization and noises from unnecessary bands are likely to get mixed into the band, by which the signal-to-noise ratio of the amplifier is adversely affected. While, in the equalization in such a low frequency band as in the toll telephone line, too, the DC component, the fundamental wave and lower harmonic component if the standard waveform signal are not transmitted, so that waveform distortions are naturally produced and adjustment of the equalizer by the waveform observation is impossible.

Figure 3:
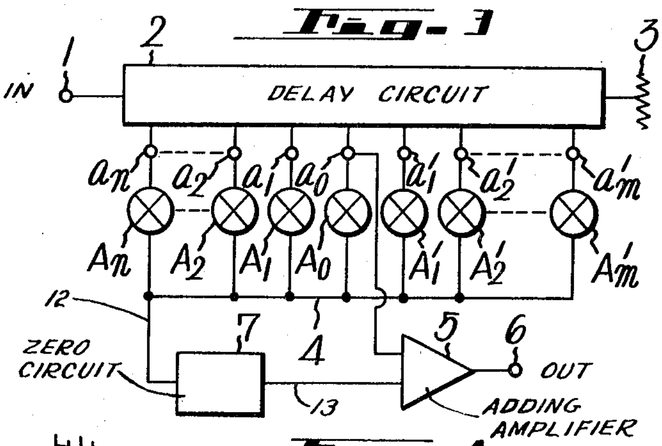
FIG. 3 is a block diagram illustrating one example of a transversal equalizer of this invention.

A detailed description will hereinafter be given of the transversal equalizer of this invention. In FIG. 3 there is illustrated in block form one example of the transversal equalizer and similar elements to those in FIG. 1 are identified by the same reference numerals and will not be described further.

A circuit 7 interposed between he common line 4 and one input terminal of the adding amplifier 5 constitutes the principal part of the transversal equalizer of this invention. The circuit 7 is actuated in such a manner as not to transmit only a particular frequency energy contained in the echo signals for correction picked up onto the common line 4 from the taps $a_0$ to $a_n$ and $a_1'$ to $a_m'$ through their corresponding adjusters $A_0$ to $A_n$ and $A_1'$ to $A_m'$, and the signal derived from the circuit 7 and the main signal from a particular tap $a_0$ are mixed together by the adding amplifier 5 to achieve equalization. In the present specification the circuit 7 and the aforementioned particular frequency will hereinafter be referred to as a zero or null circuit and a zero frequency respectively.

Figure 4:
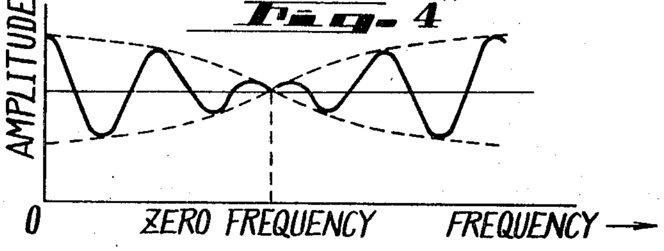
FIG. 4 is a graph showing one example of the amplitude characteristic of the transversal equalizer exemplified in FIG. 3.

A description will be made of the operation of the transversal equalizer of this invention. In the transversal equalizer of this invention the zero frequency component of the output signal is limited to that of the main signal derived from the tap $a_0$ of the delay circuit 2 through the adding amplifier 5, so that the amplitude and phase of the output signal at the zero frequency are always the same as those in the case of non-equalization irrespective of the adjustment operation of the adjusters. It will be readily seen that the amplitude characteristic of the transversal equalizer of this invention corresponding to that of the fundamental echo equalizer shown in FIG. 2 is such that the amplitude variation becomes gradually greater as the frequency deviates from the zero frequency, as depicted in FIG. 4.

The zero circuit may be easily formed with an AC bridge circuit such as a Wien bridge circuit, a twin T-type circuit or the like. For accurate equalization, however, it is necessary that the amplitude characteristic be symmetrical about the zero frequency as in the zero circuit employing delay lines described later.

Then, a method of equalization of the transversal equalizer of this invention will hereinbelow be described. A test waveform signal, which is amplitude-modulated by a square sine wave or rectangular wave, is transmitted from the transmitting end of the band-pass type transmission line and its carrier frequency is established at the center of a band.

At the receiving end the transmitted signal is subjected to waveform distortion due to deteriorated characteristic of the transmission line. Considering this phenomenon in the time domain, it may be deemed such that the incoming signal is excessively added with echos due to the deteriorated transmission characteristic in terms of the time domain. In the case of equalizing the signal with the equalizer of this invention, the aforementioned zero frequency is caused to agree with the carrier frequency and a suitable adjuster is operated based upon observation of the envelope waveform of the output of the equalizer, by which the signal is added with a correction signal such as cancelling the excessive echos to cause the waveform of the incoming signal to be equal to the signal waveform at the transmitting end or a theoretical waveform restricted in band. The effect of the zero circuit in this invention resides in that since only the side bands are corrected without causing any change in the amplitude and phase angle of the carrier, adjustment for equalization by the waveform observation is very easy to achieve. With the conventional echo equalizer employing no zero circuit, the amplitude and phase of the carrier are naturally changed by the adjustment of the adjusters except a particular adjuster of a particular higher harmonic relation to impair the amplitude and phase relations to the side band waves, so that the correction of the waveform is almost impossible. This is the very reason for which equalization of the band-pass transmission line is impossible with the conventional time equalizer.

With respect to the envelope waveform of the amplitude-modulated wave having passed through the band-pass type transmission line, it has been proved that when the amplitude and group delay characteristics are of even symmetry about the carrier no orthogonal component distortion is present in the envelope waveform. Based upon the foregoing, in the case of equalization of the band-pass type transmission line, agreement of the envelope of the incoming signal at the receiving end with that of the amplitude-modulated wave at the transmitting end by adjustment of the correction signal of the equalizer implies the completion of flattening, namely equalization of the transmission characteristic over the entire band by satisfying the requirements that the transmission characteristic of the side band waves are flat and that the transmission characteristics on both sides of the carrier frequency are of even symmetry.

The reason why the carrier of the adjustment signal is selected at the center of the band used is to remove the cause of the waveform distortion due to the orthogonal component and hence provide for enhanced accuracy to the equalization. In the waveform transmission with, for example, the vestigial side band transmission system, the test carrier frequency and zero frequency can be equalized in agreement with the carrier of the vestigial side band transmission system but the orthogonal component distortion remains, so that a synchronous detection system is required for high precision equalization. In this case, it is a matter of course that the equalization of a vestigial side band filter can also be achieved while being included in the equalization of the transmission line.

Figure 5:
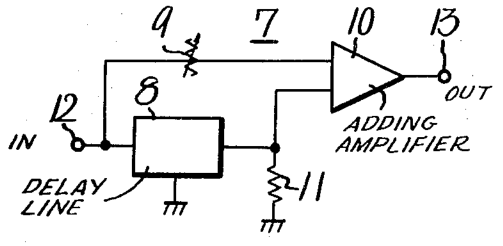
FIG. 5 is a block diagram showing one example of a zero circuit employed in the transversal equalizer of this invention.

For accurate equalization the zero circuit 7 is required to be of such characteristics that the amplitude and group delay characteristics are of even symmetry relative to the zero frequency, since these characteristics are required to be of even symmetry relative to the carrier at the end of the equalization. Further, this is important for simplification of the operation. Namely, it will be apparent that unless the characteristics of the zero circuit is of even symmetry, the equalization (symmetrization) of the zero circuit is included in the equalizing operation to introduce complexity in the operation as a whole. FIG. 5 illustrates in block form one example of the zero circuit 7 satisfying the above requirement. In the figure the input ends of a delay line 8 and a resistance attenuator 9 are connected to an input terminal 12 and the output side of the resistance attenuator 9 is connected to one input side of an adding amplifier 10.

The output end of the delay line 8 is terminated with a resistor 11 of a value equal to the characteristics impedance of the former and, also, the output end of the delay line 8 is connected to the other input side of the adding amplifier 10. The resistance attenuator 9 is for adjustment such that the signal voltages impressed to both input ends of the adding amplifier 10 may be equal to each other.

The transmission characteristic $S(\omega)$ of the zero circuit 7 of such a construction is given by the following equation.

$$\begin{aligned} S(\omega) &= 1+e^{-j\omega\tau_0} \\ &= e^{-j\omega\frac{\tau_0}{2}}\left(e^{j\omega\frac{\tau_0}{2}}+e^{-j\omega\frac{\tau_0}{2}}\right) \\ &= e^{-j\omega\frac{\tau_0}{2}}\cdot 2\cos\omega\frac{\tau_0}{2} \end{aligned} \quad (4)$$

where $\tau_0$ is the delay time of the delay line 8.

Figure 6:
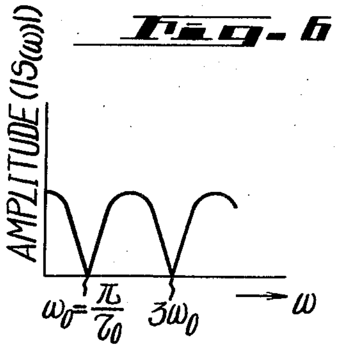
FIG. 6 is a graph showing one example of the amplitude characteristic of the zero circuit depicted in FIG. 5.

Namely, the delay characteristic of the zero circuit 7 of FIG. 5 is a flat one having a value of $\tau_0/2$ irrespective of its frequency and the amplitude characteristic has an angular frequency whose amplitude becomes zero periodically as depicted in FIG. 6 but by suitable selecting the relation to a required band, the amplitude characteristic well satisfies the symmetry about the zero frequency which is required for the equalizer of this invention. However, the zero frequency is established in such a manner that a plurality of zero frequencies may not be present in the band used. Further, it will be readily understood that even if the adding amplifier 10 is replaced with a subtracting amplifier, a zero circuit of the same principle can be provided, and the suppression degree of the zero frequency required for the zero circuit 7 is related to the equalization accuracy but need not always be perfect.

In the making of the zero circuit 7 is is often difficult to bring the delay time $\tau_0$ of the delay line 8 into agreement exactly with a calculated value. It is convenient in practice to provide a plurality of taps 14 that are fed out from the delay line 8 at suitable time intervals and the tap of a minimum delay time error is selected as depicted in FIG. 7.

Figures 7, 8:
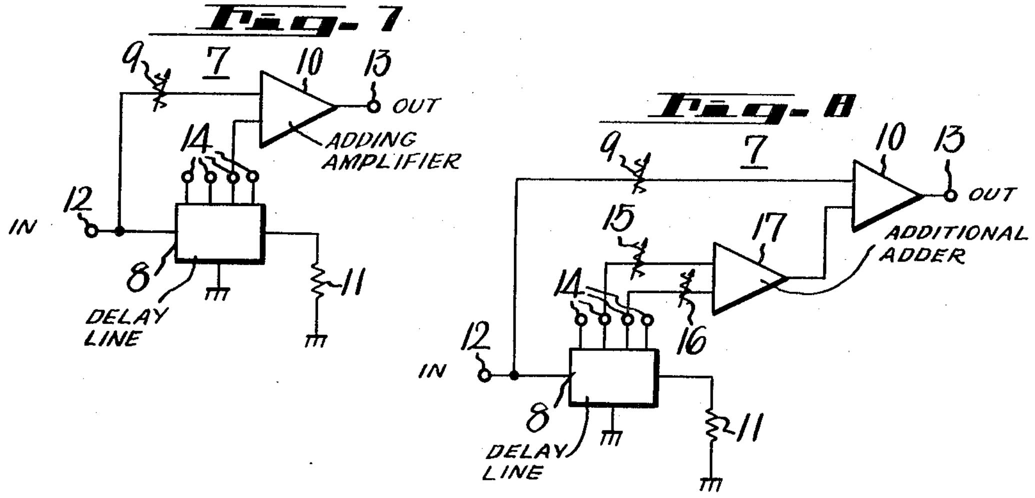
FIGS. 7, 8 and 9 are block diagrams illustrating modified forms of the zero circuit shown in FIG. 5.

In the case of requiring higher accuracy than that of the delay time obtained by the circuit of FIG. 7, the zero frequency can be set to substantially agree with a predetermined value by the use of a construction such as shown in FIG. 8. That is, signals are derived from two adjacent output terminals or taps 14 through resistance attenuators 15 and 16, which serve as signal level adjusting means and are added by an additional adder 17, thereby producing a signal which is approximately equivalent to a signal that would be produced if a new tap is provided between the taps 14 in terms of a vector. The resulting signal is added by an adder 10 to a signal derived from he resistance attenuator 9, thereby to bring the zero frequency into agreement with the predetermined value.

Figure 9:
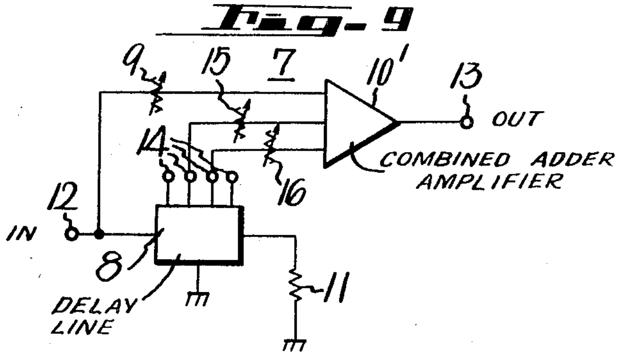

The additional adder 17 and adder 10 may be combined into a single combined adder 10′ as shown in FIG. 9.

Considering the operation of the zero circuit 7 in the time domain, the zero circuit is simply constructed such that a signal passing therethrough is added with one echoes or echos of the same signal level at a time difference $\tau_0$ to which can be regarded as one.

The transmission characteristic $R(\omega)$ of the equalizer of this invention employing the zero circuit 7 of FIG. 5 is given by the following equation (5). In this case, the delay time from the input terminal of the equalizer to the main signal tap is not taken into account as is the case with the fundamental echo equalizer.

$$R(\omega)=1+e^{-j\omega\frac{\tau_0}{2}}\cdot 2\cos\omega\frac{\tau_0}{2}\left\{k_0+\sum_{1}^{n}k_n e^{-j\omega n\tau}+\sum_{1}^{n}k_m e^{j\omega m\tau}\right\} \quad (5)$$

The amplitude and delay time characteristics can also be derived from the above equation (5) but the transversal equalizer will not be explained in the frequency domain since this is not important.

Further, the transversal equalizer of this invention does not necessitate transmission of a DC signal in principle, so that attenuation of the signal in the delay circuit 2 can be readily compensated for by respectively inserting simple AC amplifiers into the elements making up the delay circuit 2. This leads to simplification of the manufacture of the transversal equalizer of this invention.

It is a matter of course that transmission lines equalized by the transversal equalizer of this invention can be immediately used with any desired communication system, for example, FM communication system or the like.

In addition, the transversal equalizer of this invention is applicable not only to wire communication but also to wireless communication. For example, in microwave pulse communication no suitable method has been proposed for eliminating multi-path distortions due to electric wave reflection in the transmission path but such distortions can be readily removed by the transversal equalizer of this invention. Further, the equalizer of this invention similarly removes ghost interference in television broadcasting and echo distortions resulting from impedance mismatching of the antenna system.

As has been described above, the transversal equalizer of this invention is of great utility in waveform transmission and high-speed communication.

It will be apparent that many modifications and variations may be effected without departing from the scope of the novel concepts of this invention.

I claim as my invention:

1. A transversal equalizer comprising:
- a delay means having an input terminal;
- a center output terminal and a plurality of echo output means each including an adjuster, said adjusters having their output terminals joined together;
- a zero frequency circuit means connected to said output terminals to receive echo signals from said echo output means; and
- an adding means having at least two input terminals, one being connected to said center output terminal and the other being connected to the output terminal of said zero frequency circuit means to receive signals therefrom wherein the zero frequency circuit means consists of a second delay means having a predetermined delay characteristic and second adding means and a suitable signal level adjusting means is connected between one input terminal of said second adding means and an input terminal of said second delay means, thereby to equalize the signal level in said signal level adjusting means to that in the second delay means.

2. A transversal equalizer as claimed in claim 1 wherein said second delay means has a plurality of output terminals of different delay times and the output of one of said output terminals of said second delay means is supplied to the input terminal of said second adding means to provide zero frequency circuit means of a predetermined frequency.

3. A transversal equalizer as claimed in claim 2 wherein said zero frequency circuit means includes an additional adding means and two more signal level adjusting means, said signal level adjusting means being connected at one end to desired two adjacent output terminals of said second delay means and being connected at the other end to corresponding input ends of said additional adding means, the output side of said additional adding means being connected to the input end of said second adding means.

4. A transversal equalizer as claimed in claim 3 wherein said additional adding means and said second adding means are combined into one combined adder means.

5. A transversal equalizer comprising:
- a delay means having an input terminal;
- a center output terminal and a plurality of echo output terminals;
- a plurality of adjusters respectively connected to said center output terminal and said plurality of output terminals, the output terminals of said plurality of adjusters being connected together as a common terminal;
- a zero circuit means with its input terminal connected to said common terminal to receive echo signals which have passed through said plurality of adjusters, said zero circuit means preventing the passage therethrough of a predetermined AC frequency energy contained in said echo signals; and
- an adding means having at least two input terminals, one of said input terminals connected to the center output terminal and the other input terminal connected to the output terminal of said zero circuit means to receive signals therefrom not containing predetermined AC frequency energy, thereby to obtain signals for attaining exact equalization from the output terminal of said adding means.

* * * * *